O. C. SPARKS.
NUT LOCK.
APPLICATION FILED JULY 30, 1913.
1,142,464. Patented June 8, 1915.
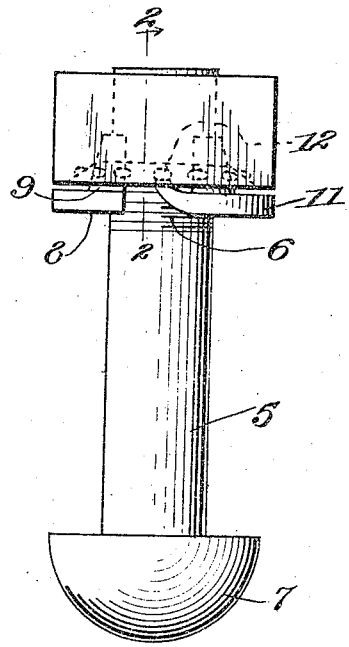
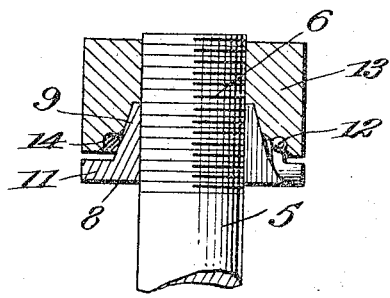
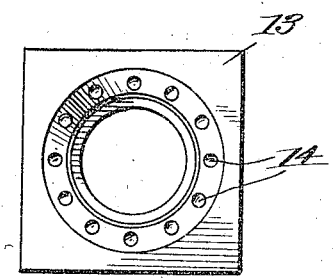
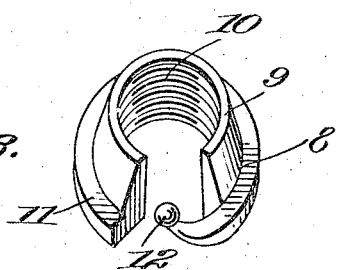
Witnesses
F. D. O'Connell
B. F. Garvey Jr.
Inventor
Oscar C. Sparks,
By Richard Bewen,
his Attorney

UNITED STATES PATENT OFFICE.

OSCAR C. SPARKS, OF ELWOOD, INDIANA.

NUT-LOCK.

1,142,464. Specification of Letters Patent. Patented June 8, 1915.

Application filed July 30, 1913. Serial No. 782,033.

*To all whom it may concern:*

Be it known that I, OSCAR C. SPARKS, a citizen of the United States, residing at Elwood, in the county of Will and State of Indiana, have invented certain new and useful Improvements in Nut-Locks, of which the following is a specification.

This invention relates to nut locks and has for its primary object to provide a nut which will be positively retained in a predetermined position on the bolt, especially adapting the same for use on railways or the like, where the nut is very often accidentally displaced due to vibration or similar causes.

Another object which this invention contemplates is the production of a nut lock, comprising an auxiliary nut arranged on the bolt subjacent the nut proper, the arrangement being of such a peculiar formation as to insure a double retaining action between the two nuts for positively retaining the same in the desired position.

Other objects as well as the nature, characteristic features and scope of my invention will be more readily understood from the following description taken in connection with the accompanying drawings and pointed out in the claim forming a part of this specification.

Referring to the drawings:—Figure 1 is an elevation of the device constructed in accordance with my invention; Fig. 2 is a sectional view taken on the line 2—2 of Fig. 1; Fig. 3 is a detail perspective view of the auxiliary nut; and Fig. 4 is a plan view of the inner face of the nut proper.

In the drawings wherein is illustrated the preferred form of this invention a bolt 5 is provided which is of the ordinary form, having a screw threaded shank 6 and a head 7.

Engaged in screw threaded relation with the threaded shank 6 of the bolt, is the auxiliary nut 8 which comprises a conical sleeve 9 having a threaded bore 10, and an annular flange 11 at the one end thereof. A portion of the nut is cut out so as to provide a split nut, the annular flange 11 of which has the one end thereof reduced and extending beyond one of the split ends, the terminal thereof being turned upwardly, and has formed thereon a spherical head 12, thereby providing a locking finger, the function of which will be more fully hereinafter described. On referring to Fig. 3 of the drawings it will be seen that the nut 8 tapers from the flange 11.

A nut proper 13 which is provided with a threaded bore is arranged in screw threaded relation with the shank 6 of the bolt, a portion of the inner bore of the nut being cut out, and the inner face of the nut beveled and communicating with said cut out portion, said beveled portion being provided with a series of spaced apart hemispherical recesses 14, which are adapted for locking engagement with the spherical head 12 of the flange 11.

In operation the auxiliary nut 8 is threaded on the shank 6 of the bolt 5, to the desired point, and the nut 13 then threaded on the shank above the auxiliary nut, having the beveled side thereof arranged so as to be engaged by the locking finger or head 12 of the flange, and the conical sleeve 9 engaging in the cut out portion which is provided in the bore of the nut 13. When in an operative position it is seen that the conical sleeve 9 extends upwardly in the nut to approximately the center thereof, and the spherical head 12 engaging one of the recesses 14 thereby providing a double retaining action between these two elements in view of the fact that the outer periphery of the conical sleeve 9 frictionally engages the cut out portion on the inner bore of the nut, providing frictional engagement therebetween, and the head 12 of the auxiliary nut 8 which engaged with the nut 13 as above described provides the second retaining means. It is of course obvious that the auxiliary nut 8 is formed of a suitable spring metal so that the same will bind against threads of the bolt when pressure is exerted by the nut 13; the nut 13 being readily disengaged from the auxiliary nut 8, by inserting a suitable instrument between the inner face of the nut 13 and the reduced end of the flange 11 so as to disengage the head 12 from the recess 14, and the nut reversely turned on the bolt so as to remove the same therefrom.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent is:—

A nut lock including, in combination with a bolt, an auxiliary nut threaded on the bolt and having a portion of its wall removed to provide a split nut adapted for contraction under pressure, the outer periphery of said nut being smooth and tapering and having one of its ends enlarged to provide an annular flange, one of the ends of said flange being extended and having a spherical enlargement formed on the free terminal of said extended portion, and a main nut threaded on said bolt having its inner face tapering inwardly toward the bore of the nut and provided with recesses in said tapering portion, the latter facilitating the entrance of the auxiliary nut for contracting the latter to snugly engage the bolt, the finger of the extended portion of said auxiliary nut engaging any of said recesses to prevent movement of the main nut in a counter direction.

In testimony whereof I affix my signature in presence of two witnesses.

OSCAR C. SPARKS.

Witnesses:
 E. D. HIEATT,
 FRANK M. PRICE.